(12) United States Patent
Stauffacher et al.

(10) Patent No.: US 6,272,982 B1
(45) Date of Patent: Aug. 14, 2001

(54) APPARATUS AND METHOD FOR EMBOSSING AND PRINTING ELONGATED SUBSTRATES

(75) Inventors: James H. Stauffacher, Middleton, WI (US); Patrick R. Garvey, Cranford, NJ (US)

(73) Assignee: Springs Window Fashions Division, Inc., Middleton, WI (US)

( * ) Notice: Subject to any disclaimer, the term of this patent is extended or adjusted under 35 U.S.C. 154(b) by 0 days.

(21) Appl. No.: 09/502,673

(22) Filed: Feb. 11, 2000

Related U.S. Application Data

(62) Division of application No. 09/240,951, filed on Jan. 29, 1999, now Pat. No. 6,183,671.
(60) Provisional application No. 60/073,086, filed on Jan. 30, 1998.

(51) Int. Cl.[7] ........................................................ B31F 1/07
(52) U.S. Cl. ............................................. 101/6; 101/181
(58) Field of Search ............................................. 101/6, 181

(56) References Cited

U.S. PATENT DOCUMENTS

| | | | |
|---|---|---|---|
| 3,481,818 | 12/1969 | Wellen . | |
| 3,594,552 | * 7/1971 | Adamson et al. | 235/92 |
| 3,681,159 | 8/1972 | Portnoy et al. . | |
| 3,840,421 | * 10/1974 | Peterson | 156/384 |
| 3,850,095 | 11/1974 | Snyder | 101/32 |
| 3,887,678 | 6/1975 | Lewicki, Jr. | 264/284 |
| 4,112,189 | * 9/1978 | Terwilliger | 428/443 |
| 4,312,686 | * 1/1982 | Smith et al. | 156/209 |
| 4,541,337 | 9/1985 | Schaul | 101/227 |
| 4,658,723 | 4/1987 | Tokuno et al. | 101/181 |
| 5,062,360 | 11/1991 | Germann et al. | 101/152 |
| 5,281,290 | 1/1994 | Bosler | 156/230 |
| 5,311,814 | 5/1994 | Kierson | 101/6 |
| 5,339,730 | 8/1994 | Ruppel et al. | 101/32 |
| 5,636,676 | * 6/1997 | Fishlin | 160/168.1 |
| 5,711,225 | 1/1998 | Rasmussen | 101/483 |
| 5,771,796 | 6/1998 | Morrison et al. | 101/22 |

* cited by examiner

Primary Examiner—John S. Hilten
Assistant Examiner—Charles H. Nolan, Jr.
(74) Attorney, Agent, or Firm—Lerner, David, Littenberg, Krumholz & Mentlik, LLP

(57) ABSTRACT

An apparatus and method for printing and embossing elongated substrates provide for both length and position registration with respect to the printed and embossed patterns. The ink pattern to embossed pattern error is corrected by stretching or relaxing the substrate between the printing and embossing assemblies.

27 Claims, 1 Drawing Sheet

APPARATUS AND METHOD FOR EMBOSSING AND PRINTING ELONGATED SUBSTRATES

This application is a divisional application of application Ser. No. 09/240,951 filed on Jan. 29, 1999, now U.S. Pat. No. 6,183,671 which claims the benefit of United States Provisional Application No. 60/073,086, filed Jan. 30, 1998, the disclosure of which is hereby incorporated by reference herein.

FIELD OF THE INVENTION

The present invention relates in general to the art of embossing and printing, and more particularly, to an apparatus and method for in-line embossing and printing registered patterns onto elongated substrates such as louvers and the like.

BACKGROUND OF THE INVENTION

Elongated louvers such as vertically and horizontally oriented slates of the type used in window treatment assemblies are well known in the art and commercially available in a wide variety of designs. The formation of louvers usually occurs through a forming machine, such as but not limited to, an extruder which produces an elongated continuous louver from a hot melt thermoplastic material such as polyvinyl chloride (PVC) and the like.

The window treatment industry has recognized the desirability of forming a decorative pattern on at least one exposed surface of the louver. By providing various decorative patterns, various effects can be obtained so as to provide a wide variety of products which will appeal to the consumer, as well as satisfying various decorating goals. It has been known to form decorative patterns in a louver by embossing a desired pattern or other like indication in at least one exposed surface of the louver through the utilization of cooperative pairs of rollers engaging opposite surfaces of the louver. For example, Kierson, U.S. Pat. No. 5,311,814 discloses an assembly for forming or embossing a decorative pattern on at least one exposed surface of an elongated slat preferably of the type used in vertical blinds. The assembly includes a pair of driven rollers which are designed, dimensioned and configured to engage opposite sides of a slat immediately subsequent to its formation by a plastic extruder. The exterior surface of one of the rollers has a decorative pattern formed thereon, and when forced into confronting engagement with an exposed surface of the slat, the decorative pattern is transferred by an embossing technique. A similar embossing process for laminated plastic panels is disclosed in Wellen, U.S. Pat. No. 3,481,818.

In order to enhance the decorative appearance of the embossed louver, it is desirable to impart color to the louver. In particular, it has been desired to provide color in a predetermined pattern, for example, within the valley formed during the embossing process. One approach is disclosed in Lewicki, Jr., U.S. Pat. No. 3,887,678 by pre-printing the substrate to be embossed with various colored ink in a predetermined pattern using conventional rotogravure printing processes. This process has rendered it extremely difficult, if not impossible, to provide alignment of the pattern on the embossing roll with the printed pattern on the substrate to be embossed. Hence, a mismatch between the two patterns is often noted which detracts from the appearance of the resulting product.

Ruppel, et al., U.S. Pat. No. 5,339,730 discloses a method for printing and embossing sheets of paper made of cellulose wadding and with two or more plies. The method discloses applying ink to one of the sheets as it travels around a first embossing roller prior to being bonded with a second sheet which passes around another embossing roller. The resulting printed pattern is sandwiched between the two sheets which are glued together.

Terwilliger, U.S. Pat. No. 4,112,189 discloses a process for multicolor valley printing and embossing of flooring material. The apparatus includes a rotatable embossing and printing roll having an engraved surface contour representing a decorative pattern to be embossed and printed on a sheet of flooring material. A plurality of rotatable pattern rolls are arranged in operative engagement with the surface of the embossing and printing roll. Each pattern roll is designed to receive a different color ink and to transfer the ink to a discrete surface area of the embossing and printing roll in a manner such that certain portions of the surface area thereof receive one color ink from a single pattern roll and other portions thereof receive overlapping layers of different color inks from at least two pattern rolls. The pattern rolls are formed with raised portions corresponding to predetermined discrete raised surface areas of the embossing and printing roll to which ink from such pattern roll is to be applied. From the foregoing, it can be appreciated that there is the requirement for maintaining proper alignment between the pattern rolls and the engraved surface of the printing and embossing roll. To accomplish this registration, the embossing and printing roll, the pattern rolls, as well as the inking rolls of the ink transfer system must all be operatively linked together by a gear train which is driven by a motor.

Snyder, U.S. Pat. No. 3,850,095 discloses an apparatus and method for embossing and valley printing of carpets with a hot melt ink. In the disclosed apparatus, hot melt ink is transferred from a pickup roll immersed in the liquefied hot melt ink to a transfer roll. From the transfer roll, the hot melt ink is transferred to a inking roll which is in operative engagement with a printing and embossing roll.

Portnoy, et al., U.S. Pat. No. 3,681,159 discloses an apparatus and method for producing a textured printed surface on rigid laminated boards by printing and embossing. Registration of the printed pattern and the embossed pattern is achieved by providing the printing and embossing rolls of identical diameter and driving them at identical rotational speeds from a single power source. Based upon this construction, there is no flexibility to accommodate any variations in the construction of the individual components of the apparatus or laminated boards which during operation of the printing and embossing operation may affect registration.

Other techniques known to effect registration between an ink pattern and an embossed pattern include the use of compensator rolls and phase change rolls. In the case of compensator rolls, a movable compensator roll is positioned between the printing and embossing assemblies over which the substrate to be printed and embossed passes. The compensator roll is displaced transverse to the straight line path of travel between the printing and embossing assemblies. This effectively lengthens or shortens the path of travel of the substrate between the printing and embossing assemblies to effect registration of the patterns. Phase change rolls, on the other hand, change the surface speed of the printing or embossing roll so as to be greater or less than the advancing speed of the substrate to be printed or embossed. Although this allows for effective registration, it suffers from the disadvantage of causing smudging of the printed ink or variations in the embossed pattern due to the differences between the surface speed of the printing or embossing roll and the surface speed of the substrate.

Accordingly, there is an unsolved need for further improvements in an apparatus and method for embossing and printing elongated substrates with registered patterns.

SUMMARY OF THE INVENTION

An object of the present invention is to provide an apparatus and method for embossing and printing elongated substrates of polymer material having elastic properties with a first and second pattern which are brought into registration with each other.

Another object of the present invention is to provide an apparatus and method for embossing and printing elongated substrates wherein registration between the printed and embossed patterns is achieved by stretching or relaxing the length of the substrate between the printing and embossing assemblies.

Another object of the present invention is to provide an apparatus and method for embossing and printing elongated substrates wherein the ink pattern printed on the substrate is length registered with the embossing pattern to be embossed on the substrate.

Another object of the present invention is to provide an apparatus and method for embossing and printing elongated substrates wherein the ink pattern on the substrate is position registered with the embossing pattern to be embossed on the substrate.

In accordance with one embodiment of the present invention there is described a method for applying a second repeating pattern onto the surface of a substrate in registration with a first repeating pattern on the substrate, the method comprising advancing a substrate past the moving surface of a first application member having a first pattern in operative association therewith; repeatedly applying the first pattern to one side of the substrate as it is advanced past the first application member; advancing the substrate past the moving surface of a second application member having a second pattern in operative association therewith, the first pattern having a repeat length different than a repeat length of the second pattern; controlling the moving surfaces of the first and second application members at speeds relative to one another so that the length of the substrate is altered whereby the repeat length of the applied first pattern on the substrate corresponds to the repeat length of the second pattern; and repeatedly applying the second pattern to the one side of the substrate in registration with the altered first pattern as it is advanced past the second application member.

In accordance with another embodiment of the present invention there is described a method for applying a second repeating pattern onto the surface of a substrate in registration with a first repeating pattern on the substrate, the method comprising advancing a substrate through a nip formed between opposing moving surfaces of a printing roll and a backing roll; supplying a continuous film having an ink pattern on one side thereof through the nip with the ink pattern facing one side of the substrate; repeatedly applying the ink pattern to the one side of the substrate as the substrate and the film are advanced through the nip; advancing the substrate past the moving surface of an embossing roll having an embossing pattern thereon, the ink pattern having a repeat length smaller than a repeat length of the embossing pattern; repeatedly applying the embossing pattern to the one side of the substrate in registration with the ink pattern as the substrate is advanced past the embossing roll; and controlling the speed of the embossing roll relative to the printing roll so that the length of the substrate is stretched or relaxed whereby the repeat length of the applied ink pattern on the substrate substantially corresponds to the repeat length of the embossing pattern and the applied ink pattern is maintained in position registration with the embossing pattern.

In accordance with another embodiment of the present invention there is described a method for applying a second repeating pattern onto the surface of a substrate in a plastic condition in registration with a first repeating pattern on the substrate, the method comprising passing the substrate past the moving surface of a first treating member having a first treating element in relation to a pattern receiving side of the substrate, the first treating element having a first pattern that is repeatedly applied to the pattern receiving side of the substrate as it passes; passing the substrate past the moving surface of a second treating member having a second treating element in relation to the pattern receiving side of the substrate, the second treating element having a second pattern that is repeatedly applied to the pattern receiving side of the substrate as it passes; initially operating the moving surfaces of the first and second treating members at speeds relative to one another so that the substrate is stretched or relaxed to bring the first and second patterns into registration; and operating the moving surfaces of the first and second treating members at speeds after the registration of the first and second patterns so that the registration of the patterns is maintained.

BRIEF DESCRIPTION OF THE DRAWINGS

The above description, as well as further objects, features and advantages of the present invention will be more fully understood with reference to the following detailed description of a method and apparatus for embossing and printing elongated substrates, when taken in conjunction with the accompanying drawing wherein.

DETAILED DESCRIPTION OF PREFERRED EMBODIMENTS

In describing the preferred embodiments of the subject matter illustrated and to be described with respect to the drawings, specific terminology will be resorted to for the sake of clarity. However, the invention is not intended to be limited to the specific terms so selected, and is to be understood that each specific term includes all technical equivalence which operate in a similar manner to accomplish a similar purpose.

Figure 1:
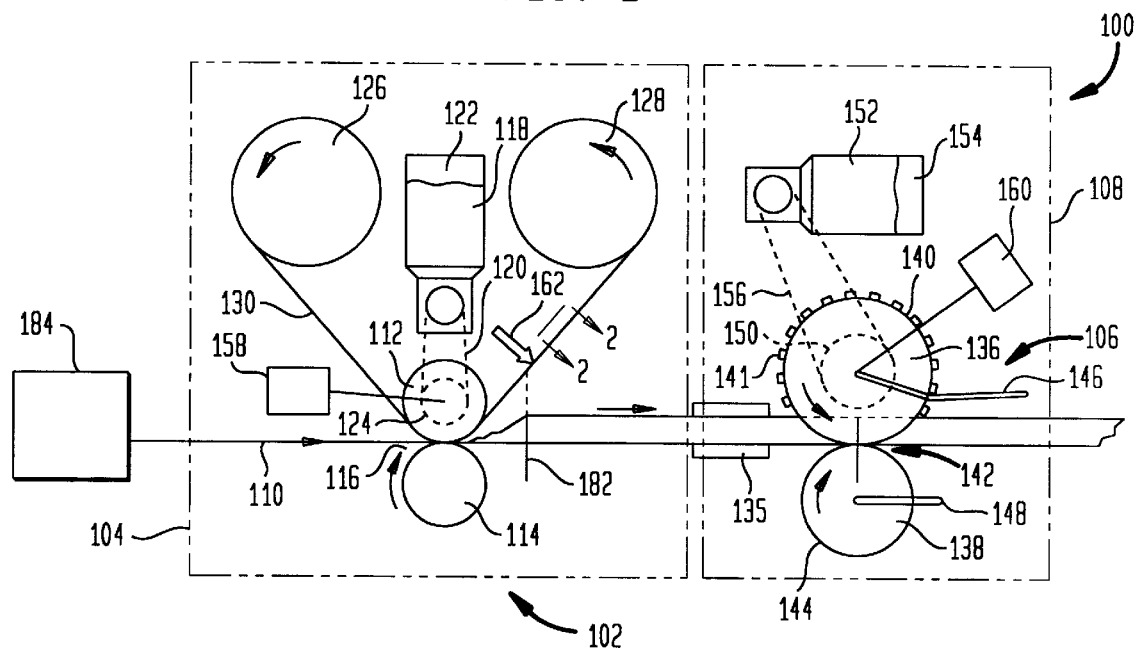
FIG. 1 is a diagrammatic illustration of the apparatus and method for embossing and printing elongated substrates in accordance with one embodiment of the present invention.

Referring now to the drawings, where like reference symbols represent like elements, there is shown in FIG. 1 an apparatus for embossing and printing elongated substrates which is generally designated by reference 100. As previously noted, the present invention is intended to have its primary application for embossing and printing of elongated substrates such as louvers in the nature of slats utilized for decorative window treatments, for example, vertical and horizontal blinds. However, it is to be understood that the present invention may be applied to the embossing and printing of other substrates which may be embossed and printed, for example, continuous lengths of synthetic elastic materials for use as decorative coverings such as polymer wall coverings, furniture, housesiding and the like. In addition, although the louvers have been described as being constructed from PVC material, it is to be understood that any other similar elastic materials such as polymers which can be embossed and printed are suitable for use with the apparatus and method of the present invention. The apparatus and method of the present invention will now be described with respect to embossing and printing of elongated louvers formed of PVC material by way of illustration only.

The apparatus 100 of the present invention includes a printing assembly 102 generally defined within the dashed lines 104 and an embossing assembly 106 generally defined within the dashed lines 108. Broadly, the printing assembly 102 is operative for printing an ink pattern onto one surface of a substrate 110 such as a louver which is being advanced through the apparatus 100. After being printed, the substrate 100 is advanced, in line, to the embossing assembly 106 where the substrate is embossed in predetermined registration with the ink pattern to produce the resulting product having the decorator appearance desired, i.e., an ink pattern and an embossed pattern.

One aspect of the apparatus 100 for printing and embossing the substrate 110 is the ability to register the ink pattern in length registration with the embossed pattern, as well as providing position registration between the ink pattern and embossed pattern. By length registration it is meant that the repeat length of the ink pattern when advanced through the embossing assembly 106 corresponds to the repeat length of the embossed pattern. As such, there is a one to one correspondence in length between the ink pattern and the embossed pattern to provide perfect length registration therebetween. On the other hand, position registration refers to maintaining the position of the ink pattern on the substrate 110 in proper positional relationship or registration with the embossed pattern on the substrate. By virtue of the apparatus 100 providing both length registration and position registration, the apparatus is operative for printing and embossing substrates 110 having elastic properties with overall registration of the two patterns.

The printing assembly 102 includes a rotationally journaled ink transfer roll 112 and backup roll 114 arranged opposing one another so as to define a nip 116 therebetween. Ink transfer roll 112 is preferably coated with a rubber coating such as Hyalon rubber, which is a manmade coating having about an 80 durometer, with a thickness of the coating of about three quarters of an inch. The ink transfer roll 112 can be obtained from American Roll of Union Grove. Wisconsin. On the other hand, the backup roll 114 is generally not provided with a rubber coating. For example, backup roll 114 may be in the nature of a steel roll with a titanium outer coating.

The ink transfer roll 112 is driven by a variable speed AC lead motor drive 118 by means of a suitable linking assembly 120 such as a drive chain or drive belt. Operation of the motor drive 118 is controlled by a suitable controller 122, both of which are well known in the art. The linking assembly 120 is operatively engaged with a driven sprocket 124 or pulley which is attached to one end of the ink transfer roll 112 or shaft (not shown) about which the roll is journaled.

The printing assembly 102 further includes an ink transfer paper supply roll 126 and a release paper rewind roll 128.

Figure 2:
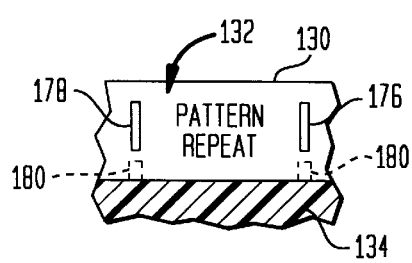
FIG. 2 is a top plan view taken along lines 2—2 in FIG. 1.

The supply roll 126 and rewind roll 126 are operative for continuously advancing a preprinted ink transfer tape 130 through the nip 116 formed between ink transfer roll 112 and backup roll 114. The ink transfer tape 130 is a composite tape as shown in FIG. 2 which includes a color preprinted ink pattern 132 deposited on one surface of a release paper 134. The ink pattern 132 may be coated with an adhesive layer (not shown) which will adhere to the substrate 110 during the printing process. Alternatively, the adhesive can be formulated within the ink pattern 132 itself. Transfer tapes 130 of the foregoing construction are available from Enhanced Technologies Corporation of Murray Hill, N.J. These transfer tapes 130 can be obtained in various predetermined colors and patterns as may be desired.

The printing assembly 102 is supported by a support structure (not shown) which allows for lateral displacement with respect to the embossing assembly 106 as to be described hereinafter. Positioned between the printing assembly 102 and embossing assembly 106 is a heater 135 which is operative for post-heating the substrate 110 received from the printing assembly 102 so as to maintain proper temperature of the substrate for embossing. Heaters 135 suitable for maintaining the proper temperature of the substrate 110 are well known in the art.

The embossing assembly 106 includes an embossing roll 136 and a backup roll 138. The embossing roll 136 is a standard embossing roll of metal construction which is well known for use in the art of embossing. The surface 140 of the embossing roll 136 is patterned with a predetermined pattern of raised portions 141. The embossing pattern to be formed in the surface 140 of the embossing roll 136 may be formed using a variety of manufacturing techniques, such as by chemical etching, milling or routing such as disclosed in Morrison, et al., U.S. Pat. No. 5,771,796.

The backup roll 138 is rotatably journaled opposing the embossing roll 136 to define a nip 142 therebetween. The surface 144 of the backup roll 138 is preferably coated with a rubber coating such as Hyalon rubber, as previously noted with respect to the ink transfer roll 112. As the material to be embossed is generally in the nature of a hot extruded PVC material, the embossing roll 136 and backup roll 138 are generally water cooled by supplying water thereto through supply pipes 146, 148, respectively.

The embossing roll 136 is coupled to a driven sprocket 150 or pulley at one end thereof or to a shaft (not shown) for rotation by a variable speed AC follower drive motor 152 having a suitable controller 154. The drive motor 152 is operatively coupled to the sprocket 150 by means of a linking assembly 156 such as a drive chain or drive belt. In general, the lead and follower drive motors 118, 152 and controllers 122, 154 may be of the same design and construction. In this regard, both of the drive motors 118, 152 are operative for receiving speed control signals from the controllers 122, 154.

Figure 3:
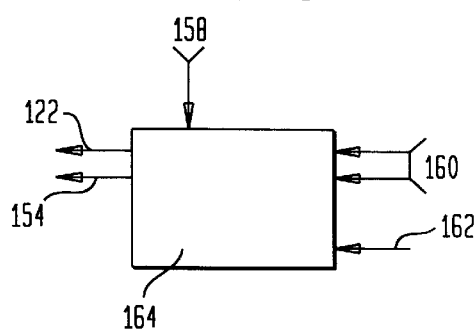
FIG. 3 is a diagrammatic illustration of a master controller for use in accordance with one embodiment of the present invention.

The apparatus 100 is provided with a computerized control system which generally includes encoders 158, 160, photoelectric eye 162 or other similar device and a master controller 164 as shown in FIG. 3. The master controller 164 is operative for receiving input signals from the encoders 158, 160 and photoelectric eye 162 and outputting the appropriate control signals for controlling the motor drives 118, 152. Output control signals are sent from the master controller 164 primarily to the controller 154 for the follower drive motor 152. However, the master controller 164 can also send output signals to the controller 122 of the lead drive motor 118 if so desired. One master controller 164 suitable for use with the apparatus 100 of the present invention is known as M-Rotary Controller, a digital motion controller, available from Powermation, Inc. of St. Paul, Minn.

Figure 4:
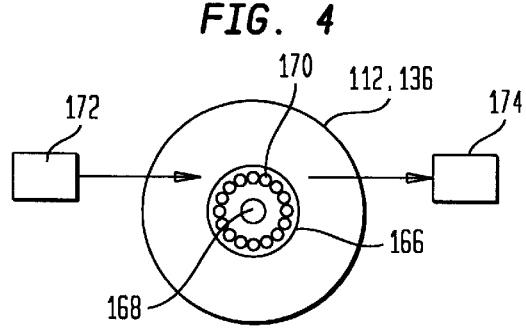
FIG. 4 is a diagrammatic illustration of an encoder for determining the surface speed of the ink transfer roll or embossing roll.

The encoders 158, 160, as partially shown diagrammatically in FIG. 4, include a wheel 166 coupled to the shaft 168 of the ink transfer roll 112 and embossing roll 136. The wheel 166 is provided with 1,200 openings 170 arranged about the circumference of the wheel. A laser 172 or other light source is operative for transmitting light through the openings 170 as the wheel 166 is rotated. An electronic eye 174 or other similar device counts the blips corresponding to each time light from the laser 172 passes through an opening 170. By counting the number of blips, the encoders 158, 160 can determine the surface speed for the ink transfer roll 112 and embossing roll 136 of a given diameter. In addition, the encoder 160 is operative for determining each time the embossing pattern on the embossing roll 136 makes one complete revolution.

Referring once again to FIG. 2, the transfer tape 130 is provided with an ink pattern 132 having a predetermined pattern length as defined between the vertical marks 176, 178. This repeat pattern is repeatedly printed on the surface of the substrate 110 by means of the printing assembly 102. Subsequently, the embossing assembly 106 will emboss the surface of the substrate 110 overlying the ink pattern 132. In order to provide the resulting printed and embossed substrate 110 with the desired pattern registration, it is desired that the ink pattern 132 be maintained in length registration with the embossed pattern, as well as being maintained in position registration therewith. Thus, by providing both length registration and position registration between the inked pattern 132 and embossed pattern, the resulting printed and embossed substrate 110 will have an enhanced visual appearance.

The apparatus 100 having now been described, the method of the present invention for printing and embossing elongated substrates having registered patterns will now be described. The following description which will refer to specific dimensions is to be understood as merely an illustrative example. As previously noted, one function of the apparatus 100 is to provide length registration between the ink pattern 132 on the transfer tape 130 with the embossed pattern on the surface 140 of the embossing roll 136. In this regard, the length of the embossing pattern on the surface 140 of the embossing roll 136 is designed to be slightly greater than the repeat length of the inked pattern 132 on the transfer tape 130. This is achieved by designing the circumference of the embossing roll 136 to be slightly greater than the repeat length of the ink pattern 132. By way of example, the circumference of the embossing roll 136 is 17.988 inches, while the repeat length of the inked pattern 132 is 17.970 inches. In other words, the embossing pattern on the embossing roll 136 is greater than the repeat length of the ink pattern 132 by 0.018 inches.

In order for the repeat length of the ink pattern 132 to match the repeat length of the embossing pattern on the embossing roll 136, the repeat length of the ink pattern needs to be increased by 0.018 inches. This is achieved by stretching the substrate 110 in the region between the spaced apart nips 116, 142 which are formed respectively between the ink transfer roll 112 and backup roll 114 and embossing roll 136 and backup roll 138. The substrate 110 may be stretched by controlling the surface speed of the embossing roll 136 to be slightly greater than the surface speed of the ink transfer roll 112. During operation of the apparatus 100, the degree of stretching can be controlled by monitoring and controlling the difference between the surface speeds between the embossing roll 136 and ink transfer roll 112.

During normal operation of the apparatus 100, the degree of stretching of the substrate 110 can be increased or decreased (such as by relaxing the substrate) to accommodate process variations whereby the repeat length of the ink pattern 132 will be maintained identical to the repeat length of the embossing pattern on the embossing roll 136. If the repeat length of the ink pattern 132 increases greater than the circumference of the embossing roll 136, the substrate 110 may be relaxed to decrease its repeat length. Alternatively, should the repeat length of the ink pattern 132 decrease, it may be increased by increasing the surface speed of the embossing roll 136. The foregoing operation can be controlled by means of the master controller 164 which is operative for outputting speed control signals to the controller 154 of the follower drive motor 152.

It is also desired that the ink and embossed patterns be aligned in position registration with each other. Depending upon the desired throughput of the apparatus 100, the rolls 112, 114 are driven at a predetermined set speed by means of the lead drive motor 118 and controller 122 under operation of the master controller 164. One throughput speed for the apparatus 100 for embossing and printing a substrate 100 such as a louver is about 30–50 feet per minute of linear substrate speed. At initial startup, it is desired that the surface speed within the nips 116, 142 be substantially or very close to each other, regardless of where the registration is between the ink pattern 132 and embossing pattern on the embossing roll 136.

During operation of the apparatus 100, the encoders 158, 160 determine the surface speed of the ink transfer roll 112 and embossing roll 136 by means of the number of blips obtained from signals received by the electric eyes 174. In this regard, although there are 1,200 openings 170 within the wheel 166, the encoders 158, 160 are operative for determining a signal both at the beginning and tailing end of the openings 170 to provide 2,400 blips, thereby increasing the accuracy of the surface speed determination. Encoder 158 outputs a signal corresponding to the surface speed of ink transfer roll 112 to the master controller 164. Similarly, encoder 160 outputs a signal corresponding to the surface speed of the embossing roll 136 to the master controller 164.

The encoder 160 is also operative for determining each time the beginning of the repeat length of the embossing pattern on the embossing roll 136 makes one complete revolution, which signal is input to the master controller 164. The master controller 164 is now receiving information concerning the surface speed of ink transfer roll 112, the surface speed of embossing roll 136, and a signal corresponding to each time the embossing pattern on the embossing roll makes one complete revolution. This is diagrammatically illustrated in FIG. 3 with the master controller 164 receiving one signal from encoder 158 and two signals from encoder 160.

The photoelectric eye 162 is positioned for detecting tick marks 180, see FIG. 2, which are imprinted on the back side of the transfer tape 130. The tick marks 180 are aligned with the beginning and end of the inked pattern 132. As shown in FIG. 1, the distance the transfer tape 130 travels between the location of the nip 116 and the location of the photoelectric eye 162 is the same distance the substrate 110 travels between the nip 116 and a predetermined location 182. This distance between the nip 16 and location 182 can be adjusted as previously described by moving the printing assembly 102 laterally such as by using a lead screw (not shown)

provided on the support structure for the printing assembly 102. In addition to the foregoing spaced arrangement, the distance between predetermined location 182 and the nip 142 defined between the embossing roll 136 and backup roll 138 is a whole multiple of the repeat pattern length of the embossing pattern on the embossing roll 136. In other words, the distance between location 182 and nip 142 corresponds to a whole multiple of the circumference of the surface 140 of the embossing roll 136.

In order to obtain position registration between the ink pattern 132 and embossed pattern, it is required that the signal generated from encoder 160 as to the completion of one revolution of the embossing roll 136, which indicates the beginning location of the embossing pattern, coincide with receipt of the signal received from the photoelectric eye 162 as to the detection of the beginning of the ink pattern 132. The master controlled 164 will control the rotational speed of the embossing roll 136 in order to have the signals from the photoelectric eye 162 and revolution signals from the encoder 160 be receiving simultaneously. In this manner, the embossing assembly 106 is the follower apparatus which is controlled or allowed to follow the printing assembly 102 which is the lead apparatus. Since the circumference of the embossing roll 136 is greater than the repeat length of the ink pattern 132 by 0.018 inches, the master controller 164 will increase the rotational speed of the embossing roll. Hence, the substrate 110 will also be stretched as the surface speed of the embossing roll 136 will be greater than the surface speed of the ink transfer roll 112. The resulting operation will not only stretch the substrate 110 so as to achieve the desired length registration, but will also provide the desired position registration.

The rotational speed of the embossing roll 136 can be increased under the programmed operation of the master controller 164. In this regard, as previously noted, the encoder 160 counts the number of blips resulting from the openings 170 in wheel 166. By operation of the master controller 164, a predetermined number of blips may be added or subtracted from the actual number counted so as to change the rotational speed of the embossing roll 136. For example, adding blips to the count will decrease the rotational speed of the embossing roll 136, while subtracting blips from the count will increase the rotational speed of the embossing roll.

From the foregoing description, if the ink pattern registration signal from the photoelectric eye 162 does not take place at the same time as the embossing pattern registration signal from the encoder 160, a plus or minus speed change will be made to the embossing roll 136 by operation of the master controller 164. The speed change of the embossing roll 136 will continue so as to stretch or relax the printed substrate 110, as may be required, until such time as the pulses from the photoelectric eye 162 and encoder 160 are simultaneously received Because the location of the photoeye 162 corresponds to location 182, and because the distance between location 182 and nip 142 is a whole multiple of the embossing pattern length, the printed ink pattern on the substrate within the embossing assembly 106 will be in both length and position registration with the embossing pattern on the embossing roll 136. During continued operation of the apparatus 100, the substrate 110 may be stretched or relaxed as may be required to maintain proper registration, both in length and position, with respect to the ink pattern and embossed pattern.

The substrate 110 such as a louver is formed from hot extruded PVC material from extruder 184 having an initial temperature of about 450–500° F. which is fed to the nip 116 between rolls 112, 114. At the nip 116, one surface of the substrate 110 is printed with the ink pattern 132 from the transfer tape 130 which is continuously being advanced therethrough by means of the rewind roll 128. As the ink pattern 132 is printed onto the substrate 110, the release paper 134 is stripped therefrom and wound upon the rewind roll 128. Subsequently, the printed substrate 110 is heated by means of heater 135 to maintain proper embossing temperature. Subsequent to embossing by the embossing roll 136, the substrate is cooled by virtue of the embossing roll and backup roll 138 being water cooled. The output temperature of the substrate 110 is generally in the range of about 250–300° F. The cooling of the substrate 110 is generally preferred so as to set the embossing.

The process of the present invention provides embossing a decorative pattern onto the surface of an ink printed elastic substrate, e.g., extruded PVC louver material, in perfect registration with the ink printed repeat pattern. The embossed pattern to ink pattern registration error is corrected by stretching or relaxing the elastic substrate and not by the use of conventional methods such as compensator rolls, phase change rolls, etc. as used on non-elastic webs such as paper and foils.

Although the invention herein has been described with reference to particular embodiments, it needs to be understood that these embodiments are merely illustrative of the principles and applications of the present invention. It is therefore to be understood that numerous modifications may be made to the illustrative embodiments and that other arrangements have been devised without departing from the spirit and scope of the present invention as defined by the appended claims.

What is claimed:

1. An apparatus for applying a second repeating pattern onto the surface of a substrate in registration with a first repeating pattern on said substrate, said apparatus comprising a first application member having a moving surface supporting a first pattern to be repeatedly applied to one side of said substrate as said substrate is advanced past said first application member; a second application member having a moving surface supporting a second pattern to be repeatedly applied overlying said first pattern on said one side of said substrate as said substrate is advanced past said second application member, said second application member having a circumference greater than the repeat length of said first pattern; a control device operatively coupled to said first and second application members, said control device controlling the speed of said moving surface of said second application member relative to said first application member so that the length of said substrate is stretched whereby the repeat length of the applied first pattern on said one side of said substrate is lengthened to substantially correspond to the repeat length of said second pattern.

2. The apparatus of claim 1, wherein said first application member comprises a printing roll having a rotating surface in printing relationship to said one side of said substrate.

3. The apparatus of claim 1, further including a backing roll arranged opposing said moving surface of said first application member to form a nip therebetween.

4. The apparatus of claim 1, wherein said second application member comprises an embossing roll having a rotating surface in embossing relation to said one side of said substrate.

5. The apparatus of claim 1, wherein said substrate comprises a louver of polymer material.

6. The apparatus of claim 1, wherein said first pattern is provided on a continuous film, said film having indicia indicating the beginning or end of said first pattern thereon.

7. The apparatus of claim 6, further including means for detecting the presence of said indicia for providing a first detection signal and means for detecting the presence of the beginning of said second pattern for providing a second detection signal.

8. The apparatus of claim 7, further including means for synchronizing the presence of said first and second detection signals whereby said first and second patterns are maintained in registration.

9. The apparatus of claim 1, wherein control device comprises at least one motor drive operatively connected to a programmed controller.

10. An apparatus for applying a second repeating pattern onto the surface of a substrate in registration with a first repeating pattern on said substrate, said apparatus comprising a printing roll and a backing roll having opposing moving surfaces forming a nip therebetween; means for supplying a continuous film having an ink pattern on one side thereof through said nip with said ink pattern facing one side of said substrate, said ink pattern being applied to said one side of said substrate as said substrate and said film are advanced through said nip; an embossing roll having an embossing pattern thereon, said ink pattern having a repeat length smaller than a repeat length of said embossing pattern, said embossing pattern being applied to said one side of said substrate in registration with said ink pattern as said substrate is advanced past said embossing roll; and means for controlling the speed of said embossing roll relative to said printing roll so that the length of said substrate is stretched or relaxed whereby the repeat length of the applied ink pattern on said substrate substantially corresponds to the repeat length of said embossing pattern and the applied ink pattern is maintained in position registration with said embossing pattern.

11. The apparatus of claim 10, further including means for controlling the surface speed of said embossing roll greater than the surface speed of said printing roll so that length registration of said ink and embossing patterns is maintained.

12. The apparatus of claim 11, further including means for controlling the surface speed of said embossing roll relative to the surface speed of said printing roll to bring said first and second patterns into said position registration.

13. The apparatus of claim 10, further including means for providing a first signal indicative of each time the beginning of said ink pattern on said film passes a predetermined location and providing a second signal indicative of each time the beginning of said embossing pattern passes a predetermined location, and means for controlling the speed of said embossing roll to synchronize said first and second signals.

14. The apparatus of claim 10, wherein said ink pattern has a repeat length less than the repeat length of said embossing pattern.

15. The method of claim 10, wherein said substrate is stretched or relaxed by said controlling means controlling the surface speed of said embossing roll greater or less than the surface speed of said printing roll.

16. The apparatus of claim 10, wherein said substrate comprises a louver of polymer material.

17. The apparatus of claim 10, further including a heater between said printing roll and said embossing roll for heating said substrate.

18. The apparatus of claim 10, wherein said film has indicia indicating the beginning or end of said pattern thereon.

19. The apparatus of claim 18, further including means for detecting the presence of said indicia for providing a first detection signal and means for detecting the presence of the beginning of said second pattern for providing a second detection signal.

20. The apparatus of claim 19, further including means for synchronizing the presence of said first and second detection signals.

21. The apparatus of claim 10, wherein said controlling means comprises at least one motor drive operatively connected to a programmed controller.

22. An apparatus for applying a second repeating pattern onto the surface of a substrate in registration with a first repeating pattern on said substrate, said apparatus comprising a first treating member having a first treating element in relation to a pattern receiving side of said substrate, said first treating element having a first pattern repeatedly applied to said pattern receiving side of said substrate; a second treating member having a second treating element in relation to said pattern receiving side of said substrate, said second treating element having a second pattern repeatedly applied to said pattern receiving side of said substrate as it passes thereby; means for operating said first and second treating members at speeds relative to one another so that said substrate is stretched or relaxed to bring said first and second patterns into length registration and for operating said first and second treating members at speeds after the registration of said first and second patterns so that the registration of said patterns is maintained.

23. The apparatus of claim 22, wherein said first treating member comprises a first roll having a rotating surface in printing relation to said pattern receiving side of said substrate; said second treating member comprises an embossing roll having a rotating surface in embossing relation to said pattern receiving side of said substrate; and the surface speed of said embossing roll is initially operated relative to the surface speed of said first roll to bring said first and second patterns into registration.

24. The apparatus of claim 22, wherein said first pattern is provided on a continuous film, said film having indicia indicating the beginning or end of said first pattern thereon.

25. The apparatus of claim 24, further including means for detecting the presence of said indicia for providing a first detection signal and means for detecting the presence of the beginning of said second pattern for providing a second detection signal.

26. The apparatus of claim 25, further including means for synchronizing the presence of said first and second detection signals whereby said first and second patterns are maintained in registration.

27. The apparatus of claim 10, wherein said operating means comprises at least one motor drive operatively connected to a programmed controller.

* * * * *